United States Patent [19]
Lehle et al.

[11] Patent Number: 5,115,898
[45] Date of Patent: May 26, 1992

[54] DISK SET WITH SPREADING DEVICES FOR CLUTCHES OR BRAKES

[75] Inventors: Hubert Lehle; Rudolf Schneider, both of Meckenbeuren, Fed. Rep. of Germany

[73] Assignee: Zahnradfabrik Friedrichshafen AG, Fed. Rep. of Germany

[21] Appl. No.: 654,619

[22] PCT Filed: Aug. 25, 1989

[86] PCT No.: PCT/EP89/01000
§ 371 Date: Feb. 19, 1991
§ 102(e) Date: Feb. 19, 1991

[87] PCT Pub. No.: WO90/02273
PCT Pub. Date: Mar. 8, 1990

[30] Foreign Application Priority Data
Aug. 25, 1988 [DE] Fed. Rep. of Germany ....... 3828800

[51] Int. Cl.$^5$ .............................................. F16D 13/52
[52] U.S. Cl. .................. 192/84 PM; 192/70.11; 192/90
[58] Field of Search .......... 192/70.11, 84 PM, 90, 192/101, 109 R

[56] References Cited
U.S. PATENT DOCUMENTS

| | | | |
|---|---|---|---|
| 942,186 | 12/1909 | Ravenshaw | 192/70.11 X |
| 942,188 | 12/1909 | Ravenshaw | 192/70.11 X |
| 942,867 | 12/1909 | Ravenshaw | 192/70.11 X |
| 2,280,736 | 4/1942 | Winther | 192/90 X |
| 2,606,638 | 8/1952 | Russell | 192/84 |
| 3,172,515 | 3/1965 | Wrensch | 192/90 |
| 3,180,469 | 4/1965 | Wiedmann | 192/90 |

FOREIGN PATENT DOCUMENTS
928135  5/1955  Fed. Rep. of Germany.

*Primary Examiner*—Leslie A. Braun
*Assistant Examiner*—Nicholas Whitelaw
*Attorney, Agent, or Firm*—Davis, Bujold & Streck

[57] ABSTRACT

The spreading apart and keeping apart of the individual disks in friction disk sets or clutches and/or brakes makes it possible to avoid drag torques and the losses of energy caused thereby. Spreading elements, in the form of magnetic bodies (8), which are inserted in disk carriers (1, 10) radially with respect to magnetizable marginal zones of the disks (4, 13) lead to equal polarity in the marginal zones concerned. A reciprocal rejection force of the individual disks (3, 14) in axial direction thereby results. Since the magnetic bodies (8) are firmly introduced in the disk carriers (1, 10), interruptions in operation and difficulties in assembly, the same as special processing of the disks, are avoided. The spreading forces themselves remain equal independently of the position and the speed. When electromagnetic coils (8A) are used, the spreading force can be switched off, for example, when actuating the piston (19) and thus the piston force is kept small.

14 Claims, 2 Drawing Sheets

DISK SET WITH SPREADING DEVICES FOR CLUTCHES OR BRAKES

The invention concerns a clutch or brake disk set with spreading devices according to the preamble of claim 1, which is based on prior art such as described in DE-C 26 01 507.

According to said citation it was known to provide spreading devices in disk sets of clutches, brakes, etc., in order to detach the disks quickly and reliably from each other when disengaging the clutch or the brake. In particular, oil-lubricated friction surfaces tend to stick to each other and, even with a disk set itself unloaded, cause considerable drag frictions or drag torques With spreading elements, a permanently sufficient spacing is again produced in the disengaged state of the disk set, an operating condition favorable to starting after stopping the vehicle also being ensured.

In addition to spreading springs between the disks, which did not make possible any full prevention of whatever further friction, spreading elements that work depending on centrifugal force and have balls radially passed between the individual disks were also known through the above prior. To retain the balls, bores are required, in the area of their drag profile, which weaken the mechanical strength of the disks and increase the cost of production. The positioning of the individual balls makes the assembly of such disk sets difficult and the overload of individual disks, at certain points, or the breaking of individual balls can cause heavy secondary failures in machines equipped with such disk sets. It is also disadvantageous that spreading elements which depend on centrifugal force also respond only after a certain rotational speed and thus, at least in the starting phase, cannot serve their purpose. The problem to be solved by the invention, departing from the above, is to be seen in providing a clutch or brake disk set with spreading devices which are simple and wear-free and which have approximately the same spreading forces during all the time they last.

According to the characteristic part of claim 1, the solution consists in providing, for spreading the disks, magnetic fields with radially oriented polarities so that the latter act especially in the peripheral direction. It has actually been found that when magnetizing the individual friction disks passing over a peripheral air gap, equidirectional polarities, situated opposite to each l0 other over the disk spacings, appear on the normally spread apart individual disk edges whereby many separate axial repulsions of the individual disks with respect to their neighbors are then produced in the whole disk set. The acting repulsion forces are on one side so slight that they are overcome, without problem, by the actuation forces and on the other side they suffice to reliably separate from one another the individual disks eventually still sticking to each other after elimination of the actuation force that activates the disk set and to hold them apart until the actuation force is again switched on. At the same time, neither the participation of centrifugal force (like in the case of the ball spreading elements) nor making allowances for mechanical residual friction (like, for example, in spring spreading elements) is necessary.

Other advantages of the invention are obtained by means of the features states in the sub-claims for special embodiments:

An especially favorable magnetic force effect is obtained when magnetic bodies are provided in the area of the supporting profile of the disks in the respective disk carrier, said magnetic bodies having a polarity pointing across the axial direction (that is, radial or tangential with respect to the disks).

Moreover, if the disks have not been made already of a magnetizable material, it is also enough if the magnetic bodies are provided with magnetizable partial areas in or on the disks only in the radially opposite marginal zones.

A uniform distribution of spreading force is obtained by distributing a few magnetic bodies of equal action on the periphery of the disk set, axially covering most part of them.

By embedding the magnetic bodies in radial recesses of the disk carriers, the magnetic bodies can be accommodated with a saving of space in the respective disk carriers of the clutch or brake in a simple manner and without a disadvantageous reduction of the mechanically highly stressed disk drivers The mounting of the magnetic bodies in the recesses of the disk carriers is also simple and the disk cross sections need not be reduced for accommodating the spreading elements.

While the magnetic bodies axially cover most of the disk set, on uniformly reciprocally offset points of the periphery, all disks of the whole set undergo a polarization of substantially equal strength according to the invention.

If the disk carriers, in case they have been made of a non-magnetic material (such as aluminum), are not themselves adequate to extend the magnetic lines of flux in the direction of the disk edges, the magnet bodies can also, in a simple manner, be embedded in pole shoes of ferromagnetic material that for their part are then to be fastened to the disk carrier.

A further intensification of the lines of flux is obtainable if the front sides of the magnets, that face the opposite disks, are surrounded in the respective disk carrier or pole shoe by a peripheral air gap with respect to the surrounding area.

The magnetic lines of flux can be produced both by means of permanent magnets and alternately by electromagnets in obviously the same way.

When electromagnets are used, the possibility to cut off the magnetic field, upon introduction of the actuation force, and to switch it on again, only when the actuation force is eliminated, is offered. Thus, the actuation force does not have to counteract the spreading force and can be smaller.

Common to all designs is the advantage that in the interspaces, between the disks and the disk carriers, absolutely no cramping components or movable structural parts are compressed so that the coolant currents can be more effective The invention is not confined to the combination of features of the claims. Other logical possible combinations of the claims and the individual features of the claims result for an expert as the problem arises.

Other details of the invention are to be understood from the explanations of the drawings.

FIG. 4 and

Figure 5:
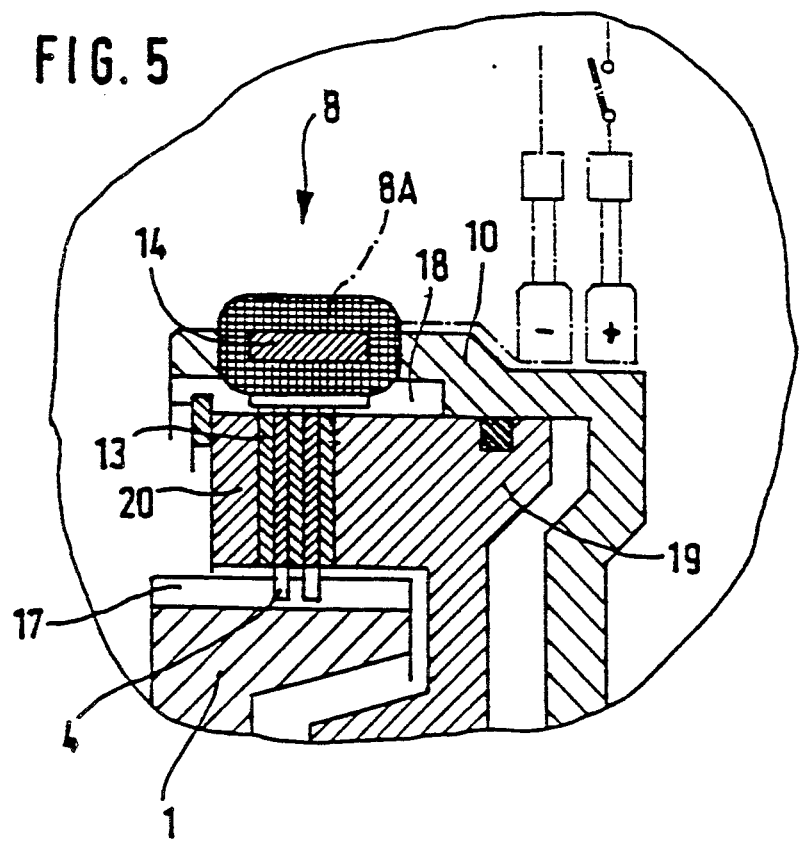

FIG. 5 show partial segments for the arrangement of a spreading element designed as electromagnet.

Figure 1:
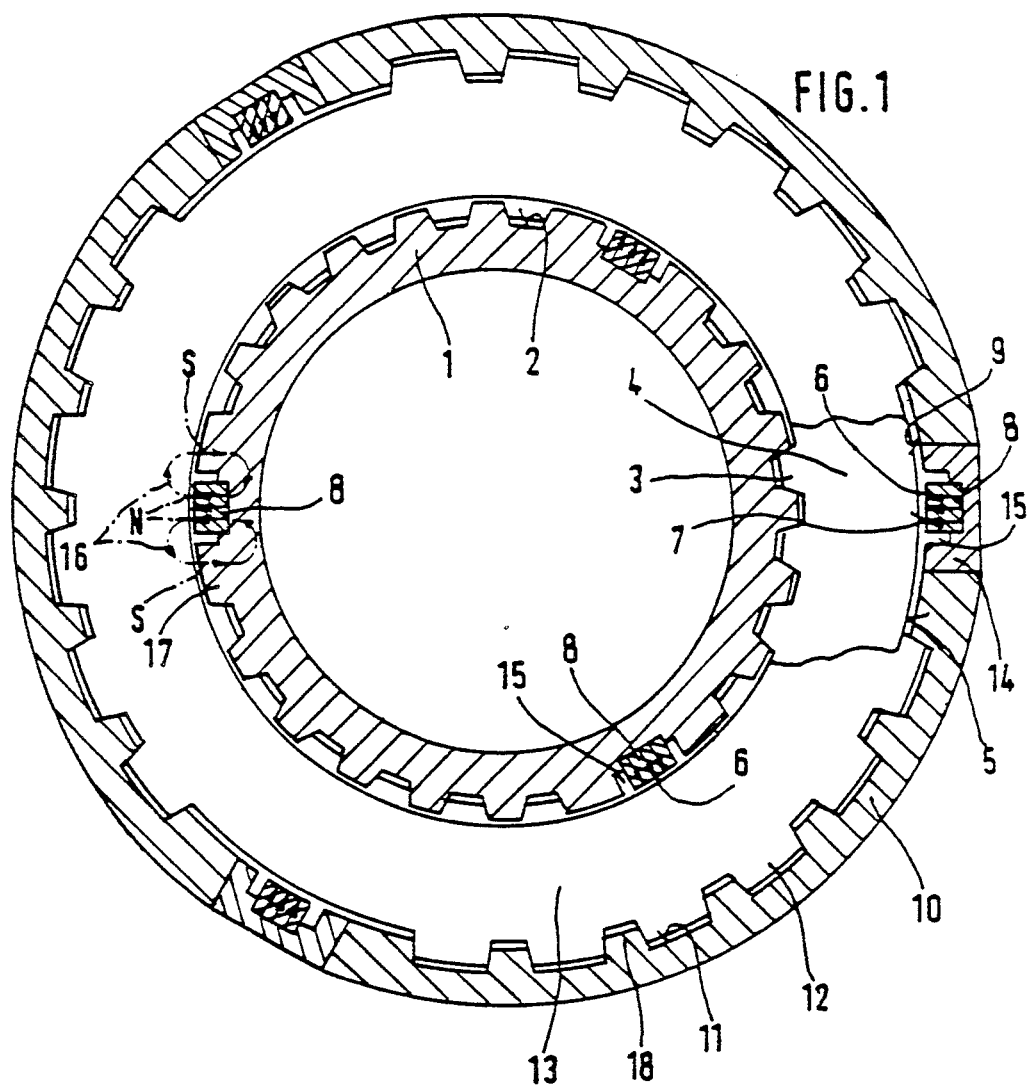
FIG. 1 shows a cross section through a disk set.
Figure 2:
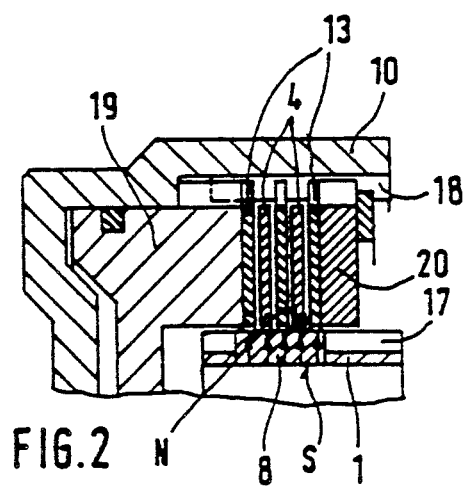
FIG. 2 shows a longitudinal section of a spread disk set.

In FIG. 1, a disk carrier 1, shown as hollow shaft, is provided with recesses 2 on its periphery which are wedge-shaped and in which tooth-shaped internal drivers 3 of an internal disk 4 mesh whose unindented external edge 5 has a radial air gap 6 opposite to a center-pointing front sides 7 of magnetic bodies which are embedded in the internal surface 9 of an external disk carrier 10, shown here as housing. The magnetic bodies 8 are, at the same time, provided with uniform peripheral distribution between internal recesses 11 on the inner surface of the external disk carrier 10 in which mesh external drivers 12 of the external disks 13 which, in alternativing axial lamination, form a disk set with the internal disks 4. In the drawing, they are equipped in the external disk carrier 10, assuming it is an aluminum housing, with magnetic bodies 8 inserted in a pole shoe 14 of ferromagnetic material. The recesses in which the magnetic bodies 8, or also the pole shoes 14 thereof, are introduced, can be favorably designed, in order to reduce scattered losses, in a manner such that, along the lateral surfaces situated in disk carriers 10 or 1, a peripheral air gap 15 is provided around the magnetic body 8 which becomes somewhat larger than the air gap 6 to the respective opposite peripheral surfaces of the disks 4 or In the left half of FIG. 1 and in the segments of FIGS. 2 and 3, the course of the lines of flux 16 emitted from an outwardly oriented magnetic body 8 into the internal disk carrier is shown. According to the figures, a north pole N results in the horizontal axis over the magnetic bodies 8 and a south pole S results radially over each one of the adjacent projections 17 of the pertaining disk carrier 1. The conditions are logically equal in an inwardly-pointing magnetic body 8 which is inserted in the external disk carrier 10. In FIG. 2, it is to be seen that radially between an internal disk carrier 1, which is relatively rotatable with respect to an external disk carrier 10, a disk set consisting of alternatively laminated internal and external disks 4, 13 is provided. The internal disk 4 has internal drivers 3 which mesh in recesses of the internal disk carrier 1 (for example, in an external gearing of a shaft formed by the radial projections 17 thereof) and the external disk 13 has external drivers 12, which mesh between projections 18 of the external disk carrier 10 in which correspondingly large recesses 11 are incorporated.

The magnetization of the disks 4, 13, starting from the magnetic body 8, in the area of their edges opposite the magnetic bodies 8 has led to formation of individual equally oriented antipoles on each disk friction surface. Since several magnetic bodies 8 are distributed on the periphery, the equidirectional polarization does not weaken, even by relative rotation of the disks with respect to each other. The equidirectional magnet poles push off each other, in the axial direction, so that the disks 4, 10 are axially pushed apart as soon as they are no longer loaded by the actuation piston 19 after its backup. Therefore, the disks 4, 10 themselves again very easily detach from each other and a drag friction does not occur during this operation since each disk is separated by a minimal space from an adjacent disk.

In order that spreading forces of substantially equal strength appear on each disk, it is advisable to design the magnetic body 8 somewhat longer than the disengaged disk set.

Figure 3:
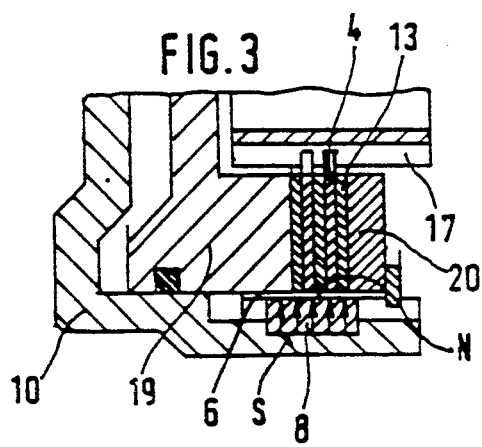
FIG. 3 shows a longitudinal section of a closed disk set.

In FIG. 3, the area around the external magnetic body 8 of the same disk set is shown in a compressed state. The pressure of the piston 19 has overcome the spreading forces by the magnetic body 8 and, without mechanically touching the magnetic bodies 8, closely presses together the disks 4, 13 against a supporting disk 20 which, by means of a guard ring, for example, is non-torsionally and axially firmly secured on the external disk carrier 10. Since the magnetic body 8 is likewise axially firm with respect to the external disk carrier 10, the edges of the disks 4, 10 always remain in their direct area of action and, immediately after any elimination of the piston control force, the spreading force can again become active or remain steadily active. By means of this spreading device, neither friction or clamping losses result nor is there the danger that the spreading elements change or break their position. The magnetic bodies 8 can be undetachably fastened rigidly and shock-free on the respectively corresponding disk carrier 1 or 10. This utilization is practicable without problems both in disks held in dry and in wet disks, that is disks running in oil, of all sizes and is an effective assistance for eliminating so-called drag torques where unnecessary losses of energy result due to static friction of the disks.

A variant of the magnetic bodies 8 can also consist in using electromagnetic coils 8A instead of permanent magnets.

Figure 4:
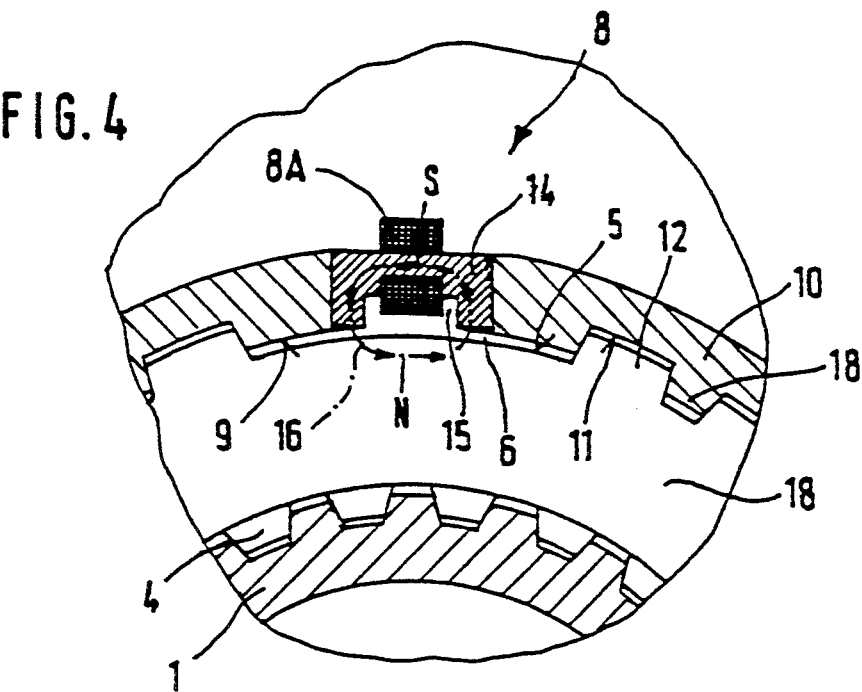

In FIG. 4, a coil 8A with a pole shoe 14 in the external disk carrier 10 is shown in cross section. The external disk carrier 10 is to be regarded as a non-magnetizable workpiece. The lines of flux 20, therefore, extend from one pole via the air gap 6 into the magnetizable marginal zones of the disks 4, 13 and in the area of the opposite pole S of the same pole shoe 14 back again via the air gap 6.

In FIG. 5 a longitudinal section of the pole shoe 14 and of the magnet coil 8A is shown. The pole shoe 14 can be fastened to the external disk carrier, for example, by gluing or by holders not shown. The axial length of the pole shoe 14 is sufficient to cover the whole length of the disk set. The core of the pole shoe 14 is surrounded in an axial direction, by the magnetizing coil 8A. A north pole N over the end remote from the piston and a south pole S over the piston-side end of the disk set 1, 10 thereby result. Current can be fed to the coils via normal cable terminals in the case of brakes whose external disk carriers stand fast. In clutches, whose external disk carriers 10 are rotatable, sliding contacts are provided as a rule.

The electric supply of the electromagnetic coils 8A, not shown, makes it possible to provide a switch to be actuated together with the piston 19 and with which the electromagnetic coils 8A are switched off during activation of the disk set 1, 10 and are switched on only upon elimination of the actuation force by the piston 19. The use of electromagnetic coils 8A also makes it possible to overcome high static friction forces between the disks 4, 13 and offers the possibility of working with a small piston 19 or lesser pressure force by switching off the spreading force.

Reference numerals 1 internal disk carrier
2 recesses on 1
3 internal driver
4 internal disk
5 external edge of 4

6 radial air gap
7 front side of 8
8 magnet body
8A magnet coils
9 internal surface
10 external disk carrier
11 internal recesses of 10
12 external driver of 13
13 external disks
14 pole shoe
15 peripheral air gap
16 lines of flux
17 projections of 1
18 projections of 10
19 piston
20 supporting disk

We claim:

1. A disk set for one of a clutch and a brake comprising:
   an internal disk carrier (1) supporting at least one disk (4) rotatable therewith,
   an external disk carrier (10) supporting at least one disk (13) rotatable therewith,
   said internal and said external disk carriers (1, 10) being rotatable relative to one another,
   means for supplying a compressive force (19) to said disks for enaging a disk set formed by said disks, and
   spreading means for repeatedly spacing apart said disks of from one another upon disengagement of said disk set,
   wherein said spreading means (8) comprises a plurality of magnetic fields (16) with radially oriented poles provided for spacing apart said disks, of said internal and said external disk carriers (1, 20), upon disengagement of said disk set.

2. A disk set according to claim 1, wherein said magnetic fields (16) are generated by magnetic bodies carried by a supporting section (3, 12 or 17, 18) of each of said internal and said disk carriers (1, 10).

3. A disk set according to claim 1, wherein said disks (4, 13) have radially opposite magnetizable marginal zones which are coordinated with said magnetic bodies (8).

4. A disk set according to claim 1, wherein said magnetic bodies (8) are distributed about an interior and an exterior periphery of said disk set (4, 13) and axially cover a major portion thereof.

5. A disk set according to claim 1, wherein said internal and said external disk carriers (1, 10) have radial recesses and said magnetic bodies (8) are inserted in said radial recesses.

6. A disk set according to claim 1, wherein said internal and said external disk carriers (1, 10) have pole shoes (14) comprising a ferromagnetic material and said magnetic bodies (8) are inserted in said pole shoes (14), and said internal and said external disk carriers are made of a non-magnetic material.

7. A disk set according to claim 1, wherein a peripheral air gap is formed between said magnetic bodies (8) and said internal and said external disk carriers (1 or 10) and between said dosls (4, 13) and a front face (7) of said magnetic bodies (8) facing said disks (4, 13).

8. A disk set according to claim 1, wherein said magnetic fields (16) are produced by magnetic bodies (8) in the form of permanent magnets.

9. A disk set according to claim 1, wherein each of said internal and said external disk carriers (1, 10) supports a plurality of disks (4, 13).

10. A disk set according to claim 1, wherein said magnetic fields (16) are produced by magnetic bodies (8) in the form of electromagnets.

11. A disk set according to claim 10, wherein said magnetic bodies (8) have electromagnetic coils (8A) which are deactivated when a compressive force is supplied to said disk set, and said electromagnetic coils (8A) are activated upon elimination of said compressive force applied to said disk set.

12. A disk set according to claim 6, wherien a peripheral air gap is formed between said magnetic bodies (8) and said pole shoes (14) and between said disks (4, 13) and a front face (7) of said magnetic bodies (8) facing said disks (4, 13).

13. A disk set for one of a clutch and a brake comprising:
    an internal disk carrier (1) supporting at least one first disk (4) rotatable therewith,
    an external disk carrier (10) supporting at least one second disk (13) rotatable therewith,
    said internal and said external disk carriers (1, 10) being rotatable relative to one another,
    means for supplying a compressive force (19) to said first and second disks for engaging a disk set formed by said first and second disks, and
    spreading means for repeatedly spacing apart said first and said second disks from one another upon elimination of said compressive force applied to said disk set,
    wherein said spreading means (8) comprises at least one magnetic field (16) with radially oriented poles provided for spacing apart said first and second disks of said internal and said external disk carriers (1, 20) upon elimination of said compressive force applied to said disk set.

14. A disk set according to caim 13, wherein said internal disk carrier (1) supports a plurality of first disks (4), and
    said external disk carrier (10) supports a plurality of second disks (13).

* * * * *